United States Patent
Ishikawa

(10) Patent No.: US 10,914,101 B2
(45) Date of Patent: Feb. 9, 2021

(54) DOOR LATCH ASSEMBLIES FOR VEHICLES INCLUDING LATCH RELEASE LEVER BLOCKING STRUCTURES

(71) Applicant: Toyota Motor Engineering & Manufacturing North America, Inc., Erlanger, KY (US)

(72) Inventor: Yoshiki Ishikawa, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 513 days.

(21) Appl. No.: 15/800,552

(22) Filed: Nov. 1, 2017

(65) Prior Publication Data

US 2019/0128025 A1    May 2, 2019

(51) Int. Cl.
*E05B 77/04*    (2014.01)
*B60J 5/04*    (2006.01)

(52) U.S. Cl.
CPC ............. *E05B 77/04* (2013.01); *B60J 5/0412* (2013.01); *B60J 5/0461* (2013.01)

(58) Field of Classification Search
CPC .......... E05B 77/02; E05B 77/04; E05B 77/06; E05B 77/245; E05B 15/022; Y10S 292/22; Y10S 292/65; Y10T 292/03; Y10T 292/57; Y10T 292/0908; Y10T 292/1047; Y10T 292/17; B60J 5/0461; B60J 5/0412
USPC .... 292/DIG. 22, DIG. 65, 1, 336.3, 92, 216, 292/253; 296/187.12
See application file for complete search history.

(56) References Cited

U.S. PATENT DOCUMENTS

| | | | | |
|---|---|---|---|---|
| 4,382,622 A * | 5/1983 | Ishikawa | ............... | E05B 77/12 292/216 |
| 4,995,654 A * | 2/1991 | Nishigami | ............... | E05B 77/12 292/216 |
| 6,065,797 A * | 5/2000 | Shirasaka | ............... | E05B 77/12 292/DIG. 65 |
| 6,880,867 B2* | 4/2005 | Schoen | ............... | E05B 77/06 292/216 |
| 7,111,880 B2* | 9/2006 | Saitoh | ............... | E05B 77/04 292/336.3 |

(Continued)

FOREIGN PATENT DOCUMENTS

| | | |
|---|---|---|
| CN | 102605992 | 9/2014 |
| DE | 19803871 | 12/2000 |

(Continued)

*Primary Examiner* — Christine M Mills
(74) *Attorney, Agent, or Firm* — Dinsmore & Shohl LLP

(57) ABSTRACT

A vehicle includes a vehicle door assembly including a door handle assembly and a door latch assembly that includes a door latch device operatively connected to the door handle assembly using a latch release lever that moves along a travel path to place the door latch device in an unlatched configuration. A latch release blocking structure is located within an interior volume of the vehicle door assembly. The latch release blocking structure includes a first leg that is mounted to a support portion. An overhang portion is connected to the first leg. The overhang portion extends over at least a portion of the travel path of the latch release lever. A second leg extends from the overhang portion toward the support portion to a free end that is spaced from the mounting structure providing a gap along the travel path of the latch release lever.

20 Claims, 5 Drawing Sheets

(56) References Cited

U.S. PATENT DOCUMENTS

| | | | | | |
|---|---|---|---|---|---|
| 7,648,192 | B2 * | 1/2010 | Herline | | E05B 77/04 292/92 |
| 8,079,631 | B2 * | 12/2011 | Higgins | | E05B 77/04 292/259 A |
| 8,128,151 | B2 * | 3/2012 | Teramoto | | E05B 77/04 292/259 A |
| 8,235,451 | B2 * | 8/2012 | Jordan | | E05B 77/02 292/259 A |
| 8,360,486 | B2 * | 1/2013 | Gschweng | | E05B 17/0062 292/336.3 |
| 8,387,311 | B2 * | 3/2013 | Heller | | B60J 5/0451 296/146.1 |
| 8,414,038 | B2 * | 4/2013 | Bedekar | | E05B 77/04 292/216 |
| 8,465,064 | B2 * | 6/2013 | Ghannam | | E05B 77/04 292/216 |
| 8,701,817 | B2 * | 4/2014 | Schoen | | E05B 77/04 180/281 |
| 8,833,812 | B2 * | 9/2014 | Sakai | | E05B 77/06 292/336.3 |
| 9,045,917 | B2 * | 6/2015 | Gschweng | | E05B 53/00 |
| 9,243,429 | B2 | 1/2016 | Bendel et al. | | |
| 9,534,424 | B2 | 1/2017 | Bendel et al. | | |
| 9,631,402 | B2 * | 4/2017 | Bejune | | E05B 77/06 |
| 9,752,355 | B2 * | 9/2017 | Nagaoka | | E05B 77/04 |
| 10,287,805 | B2 * | 5/2019 | Faust | | E05C 3/12 |
| 10,526,817 | B2 * | 1/2020 | Gray | | E05B 77/04 |
| 2014/0319857 | A1 * | 10/2014 | Zimmer | | E05B 77/04 292/341.17 |
| 2015/0167358 | A1 * | 6/2015 | Bejune | | E05B 77/04 292/195 |
| 2016/0108645 | A1 | 4/2016 | Kim | | |

FOREIGN PATENT DOCUMENTS

| | | | | |
|---|---|---|---|---|
| DE | 102005023123 A1 * | 3/2006 | | B60J 5/107 |
| DE | 102008021158 A1 * | 10/2009 | | E05B 77/04 |

* cited by examiner

DOOR LATCH ASSEMBLIES FOR VEHICLES INCLUDING LATCH RELEASE LEVER BLOCKING STRUCTURES

TECHNICAL FIELD

The present specification generally relates to door latch assemblies for vehicles and, more specifically, to door latch assemblies including latch release lever blocking structures.

BACKGROUND

Door latch assemblies for vehicles may be provided and are used to latch a vehicle door, such as a driver side door or a passenger side door in a closed position. The door latch assemblies may include a door latch device within the vehicle door that can engage a cooperating structure, such as a striker that is located on a frame of the vehicle. The vehicle door may remain in the closed position until a vehicle occupant actuates a door handle, which then opens the door latch device.

For some side impact tests, vehicle door structures may move inboard, which may affect operation of the door latch assemblies. What is desired are blocking structures that can block unintended actuation of the door latch assemblies under certain side impact conditions.

SUMMARY

In one embodiment, a vehicle includes a vehicle door assembly including a door handle assembly and a door latch assembly that includes a door latch device operatively connected to the door handle assembly using a latch release lever that moves along a travel path to place the door latch device in an unlatched configuration. A latch release blocking structure is located within an interior volume of the vehicle door assembly. The latch release blocking structure includes a first leg that is mounted to a support portion. An overhang portion is connected to the first leg. The overhang portion extends over at least a portion of the travel path of the latch release lever. A second leg extends from the overhang portion toward the support portion to a free end that is spaced from the mounting structure providing a gap along the travel path of the latch release lever.

In another embodiment, a vehicle door assembly includes a door handle assembly and a door latch assembly that includes a door latch device operatively connected to the door handle assembly using a latch release lever that moves along a travel path to place the door latch device in an unlatched configuration. A latch release blocking structure is located within an interior volume of the vehicle door assembly. The latch release blocking structure includes a first leg that is mounted to a support portion. An overhang portion is connected to the first leg. The overhang portion extends over at least a portion of the travel path of the latch release lever. A second leg extends from the overhang portion toward the support portion to a free end that is spaced from the mounting structure providing a gap along the travel path of the latch release lever.

In yet another embodiment, a method of inhibiting movement of a door latch assembly of a vehicle from a latched configuration to an unlatched configuration is provided. The method includes connecting a first leg of a latch release blocking structure to a support portion located within an interior of a vehicle door assembly. The vehicle door assembly includes a door handle assembly and a door latch assembly that includes a door latch device operatively connected to the door handle assembly using a latch release lever that moves along a travel path to place the door latch device in an unlatched configuration. The latch release blocking structure includes an overhang portion that is connected to the first leg. The overhang portion extends over at least a portion of the travel path of the latch release lever. A second leg extends from the overhang portion toward the support portion to a free end. A gap is provided between the support portion and the free end along the travel path of the latch release lever.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles including vehicle door assemblies that include door latch assemblies. The door latch assemblies are used to latch the vehicle door assemblies in a closed position. The door latch assemblies include a door latch device that may be located within the vehicle door assemblies. The door latch device can engage a cooperating structure, such as a striker, to hold the vehicle door assembly in the closed position until a vehicle door handle assembly is operated. The door handle assembly may be operatively connected to the door latch device using a latch release lever. The latch release lever may be part of the connection between the door handle assembly and the door latch device.

During certain side impact conditions, vehicle door structures within the vehicle door assemblies can move inboard and other directions. Movement of the vehicle door structures can include the latch release lever. To inhibit unintended movement of the latch release lever, a latch release lever blocking structure is provided. The latch release blocking structure is provided to move into a travel path of the latch release lever under side impact conditions where the latch release lever blocking structure is moved due to an external force applied to the vehicle door assembly. The latch release blocking structure is moved into the travel path of the latch release lever to close a gap that is present under normal operating conditions and prevent unintended movement of the latch release lever that may affect operation of the door latch device.

Figure 1:
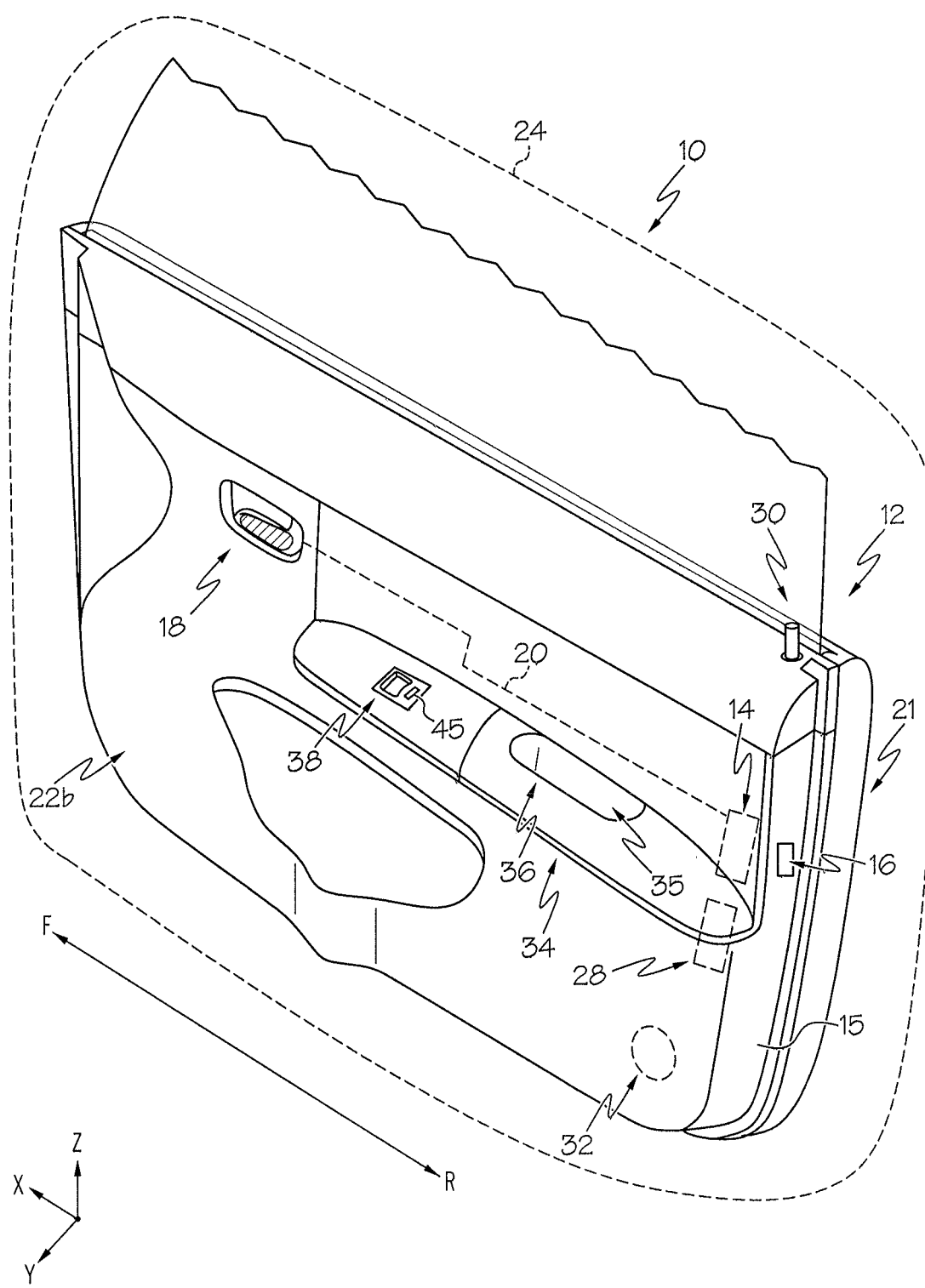
FIG. 1 is an interior view of a vehicle door assembly of a vehicle including a door latch assembly and a door lock apparatus, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Referring to FIG. 1, a vehicle 10 includes a vehicle door assembly 12 and a door latch assembly 14. The door latch assembly 14 includes a door latch device 16 that is positioned at a shut face panel 15 of the vehicle door assembly 12. The door latch device 16 is operatively connected to both an interior door handle assembly 18 and an exterior door handle assembly. The interior door handle assembly 18 is accessible to a vehicle operator from inside the vehicle 10, while the exterior door handle assembly is accessible from outside the vehicle 10. The door handle assemblies 18 are operatively connected to the door latch device 16 through one or more linkages, including a latch release lever 20. As will be described in greater detail below, the latch release lever 20 is used to move the door latch device 16 from a latched configuration to an unlatched configuration. In the latched configuration, the door latch device 16 is engaged with a cooperating structure, such as a striker to inhibit unintended opening of the vehicle door assembly 12. In the unlatched configuration, the door latch device 16 disengages the cooperating structure, which allows the vehicle door assembly 12 to be opened. In the illustrated example, the vehicle door assembly 12 may be a front driver's door; however, the door latch assembly 14 may be equally applicable to any of the vehicle doors, including a rear door (e.g., of an SUV, van, etc.).

The vehicle door 12 may include an outer panel 21 and one or more inner panels 22 that are connected to the outer panel 21 to define a volume therebetween. The outer panel 21 may be an outer visible panel of a vehicle body 24, while the inner panel 22 may be an interior door trim panel that is visible from inside the vehicle 10. Although not seen in FIG. 1, there may also be another inner panel that is connected to the outer panel 21. The trim panel 22 can connect to that inner panel. The door latch assembly 14 may be located at least partially within the volume between the outer panel 21 and the inner panel 22 of the vehicle door 12. The door latch assembly 14 may be operatively coupled to the vehicle door handles 18 that can be used to move the door latch assembly 14 between unlatched and latched configurations for opening and closing the vehicle door 12 against the vehicle body 24. The door latch assembly 14 may be moved from the latched to the unlatched configuration by manually tugging on the vehicle door handle 18, which may be biased toward the latched configuration.

A door lock apparatus 28 may be linked to the door latch assembly 14 and the vehicle door handle 18. The door lock apparatus 28 can be used to disengage the vehicle door handle 18 from the door latch assembly 14 in a locked configuration, to disallow unlatching of the door latch assembly 14 using the vehicle door handle 18. The door lock apparatus 28 may be operated a variety of ways. For example, the door lock apparatus 28 may be operated using a door lock pin 30 that extends outwardly from the inner panel 22. An actuator 32 (e.g., a motor) may be used to operate the door lock apparatus 28 upon user command.

The inner panel 22 may further include an armrest 34 that extends into a cabin of the vehicle 10. The armrest 34 may include a handle portion 36 that is provided by an opening 35 that extends into the armrest 34 in the vehicle vertical direction (+/−z). The handle portion 36 can facilitate grasping of the armrest 34 to facilitate opening and closing of the vehicle door assembly 12. Located forward of the armrest 34 in the vehicle longitudinal direction (+/−x) is the interior vehicle door handle assembly 18. The vehicle door assembly 12 can be unlatched and opened using the vehicle door handle assembly 18, as described above. Located on the armrest 34 between the vehicle door handle 18 and the handle portion 36 may be a switch mount assembly 38. The switch mount assembly 38 may include any number of switches 45 (e.g., momentary switches) that can be moved or toggled between various positions depending on the type of switch. For example, a window control switch may be moved between UP, DOWN and OFF positions. A door lock switch may be moved between LOCK and UNLOCK positions. The door lock switch may be used to activate the actuator 32 to move the door lock apparatus 28 between the lock and unlock configurations. A window lock switch may be provided that can allow the operator to lock movement of passenger windows.

Figure 2:
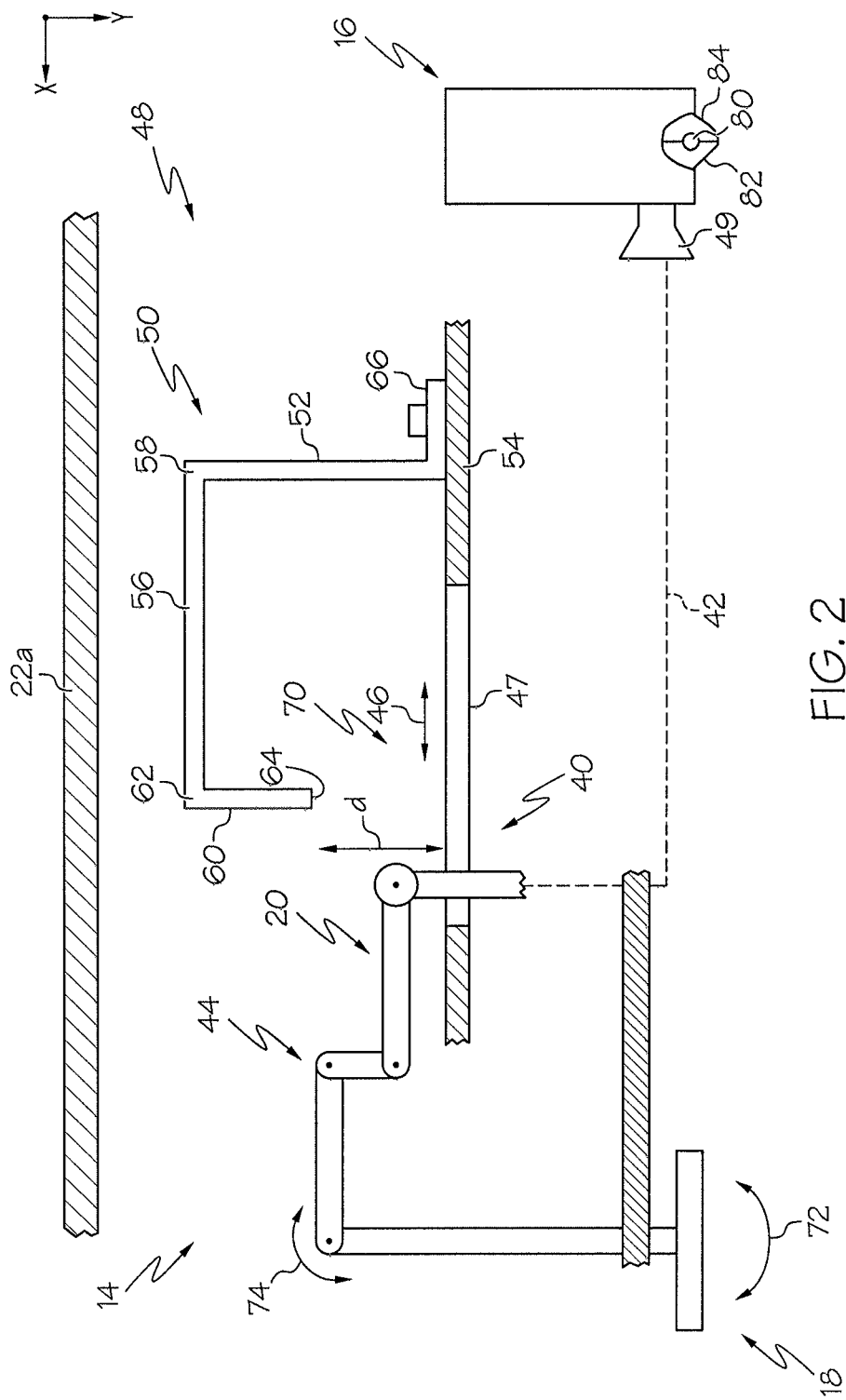
FIG. 2 is a diagrammatic view of the door latch assembly for use with the vehicle door assembly of FIG. 1 in a latched configuration, according to one or more embodiments shown and described herein.

Referring to FIG. 2, the door latch assembly 14 is illustrated diagrammatically and in isolation. The door latch assembly 14 can be mounted within a volume 48 between the inner panels 22a and 22b to either one or both of the inner panels 22a and 22b using a door handle mounting bracket 40. The door handle mounting bracket 40 may be mounted to the inner panels 22a and 22b using any suitable method, such as by fastening the door handle mounting bracket 40 to the inner panels 22a and 22b such that the interior door handle assembly 18 is accessible to a vehicle operator from inside the vehicle 10.

The interior door handle assembly 18 is operatively linked to the door latch device 16, as represented by the dotted line 42. The interior door handle assembly 18 is linked to the door latch device 16 using the latch release lever 20, which may be part of several mechanical linkages 44 that link the interior door handle assembly 18 to the door latch device 16. In some embodiments, the latch release lever 20 may link directly or indirectly to the door latch device 16. The latch release lever 20 has a travel path that extends in the vehicle longitudinal direction, as represented by arrow 46. The travel path 46 may be located alongside a slot 47 that may be formed in the door handle mounting bracket 40. The mechanical linkages 44 may extend from the latch release lever 20 for actuating a latch release member 49 of the door latch device 16.

A latch release blocking structure 50 is mounted to the door handle mounting bracket 40. In some embodiments, the latch release blocking structure 50 includes a first leg 52 that extends outwardly from a support portion 54 of the door handle mounting bracket 40 in the vehicle lateral direction to an overhang portion 56. The overhang portion 56 is connected to the first leg 52 at a bend 58 to extend over at least a portion of the travel path 46 in the vehicle longitudinal direction. A second leg 60 is connected to the overhang portion 56 by a bend 62 such that the second leg 60 extends toward the door handle mounting bracket 40 to a free end 64. While the first leg 52 and the second leg 60 are illustrated as being substantially parallel, other shapes may be used depending at least in part on the space constraints within the volume 48.

The latch release blocking structure 50 may be connected to the door handle mounting bracket 40 at the first leg 52. For example, the first leg 52 may include a foot 66 that is fastened to the door handle mounting bracket 40 forming a cantilevered support for the latch release blocking structure 50. The first leg 52 and the foot 66 may be spaced from the travel path 46 of the latch release lever 20 in the vehicle longitudinal direction, while the second leg 60 and the free end 64 may be located over the travel path 46 in the vehicle lateral direction.

The free end 64 of the second leg 60 is spaced from the door handle mounting bracket 40 a distance d providing a gap 70 through which the latch release lever 20 may pass by the free end 64 during normal operation as illustrated by FIG. 2. As can be appreciated, rotation of the interior vehicle door handle 18 in the direction of arrows 72 and 74 results in movement of the latch release lever 20 in the vehicle longitudinal direction along the travel path 46.

FIG. 2 illustrates the interior door handle assembly 18 in an initial, unactuated configuration and the door latch assembly 14 in a latched configuration. In the unactuated configuration, the door latch device 16 may be engaged with a cooperating structure, such as striker 80. In particular, the door latch device 16 may include opposing engagement structures 82 and 84 that can clamp around the striker 80 with the vehicle door assembly 12 in the closed position. In some embodiments, the opposing engagement structures 82 and 84 may be biased (e.g., using springs) toward an unlatched configuration where the engagement structures 82 and 84 are disengaged from the striker 80 to allow for opening of the vehicle door assembly 12.

Figure 3:
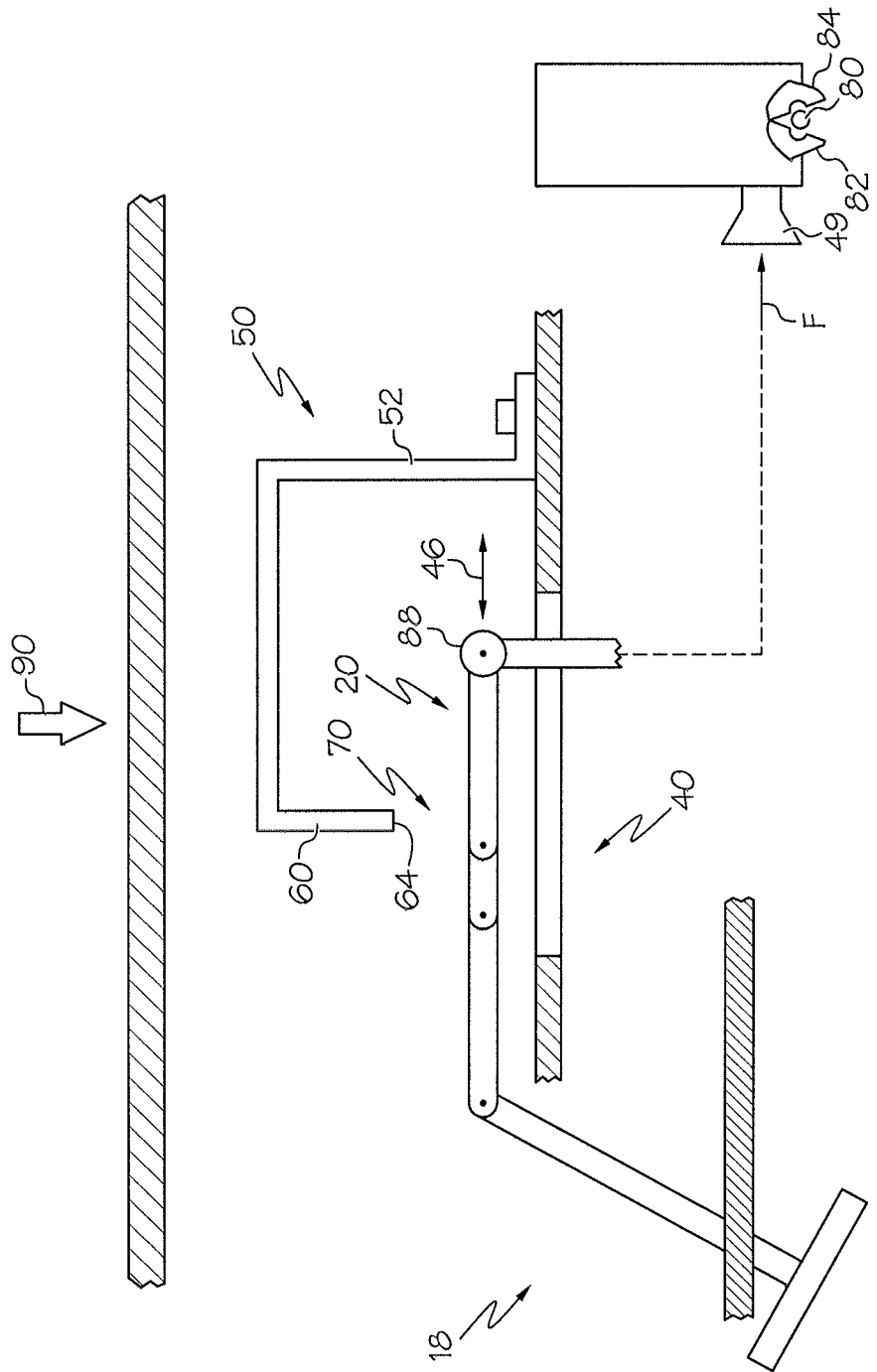
FIG. 3 is a diagrammatic view the door latch assembly for use with the vehicle door assembly of FIG. 1 in an unlatched configuration, according to one or more embodiments shown and described herein.

Referring now to FIG. 3, the interior door handle assembly 18 is illustrated in an actuated configuration with the latch release lever 20 extending beyond the free end 64 of the second leg 60 in the vehicle longitudinal direction. The latch release blocking structure 50 provides the gap 70 that allows for movement of the latch release lever 20 along the travel path 46. In this example, the latch release lever 20 extends from the interior door handle assembly 18 and through the gap 70 between the free end 64 of the second leg 60 and the door handle mounting bracket 40. In the actuated configuration, the latch release lever 20 has an end 88 that is located nearer to the first leg 52 than with the interior door handle assembly 18 in the unactuated configuration. Movement of the latch release lever 20 applies a force F against the latch release member thereby allowing movement of the engagement structures 82 and 84 away from the striker 80.

When a vehicle experiences an impact, vehicle structures may elastically and plastically deform while the vehicle slows from its previous operating speed. The impact diverts the energy associated with a moving vehicle into energy that deforms vehicle structures. The vehicle structures may be designed to accommodate such impact events, such that the energy associated with the impact may be controllably dissipated through selective and preferential deformation of the vehicle structures.

When a vehicle experiences a side impact, energy may be received in the areas of the vehicle door assembly 12 as represented by arrow 90. As the door structures move inward in the vehicle lateral direction, they may impinge upon the interior door handle assembly 18 and the door latch assembly 14. In order to inhibit unintended movement of the latch release lever 20 during such movement of the vehicle door structures, the latch release blocking structure 50 is provided.

Figure 4:
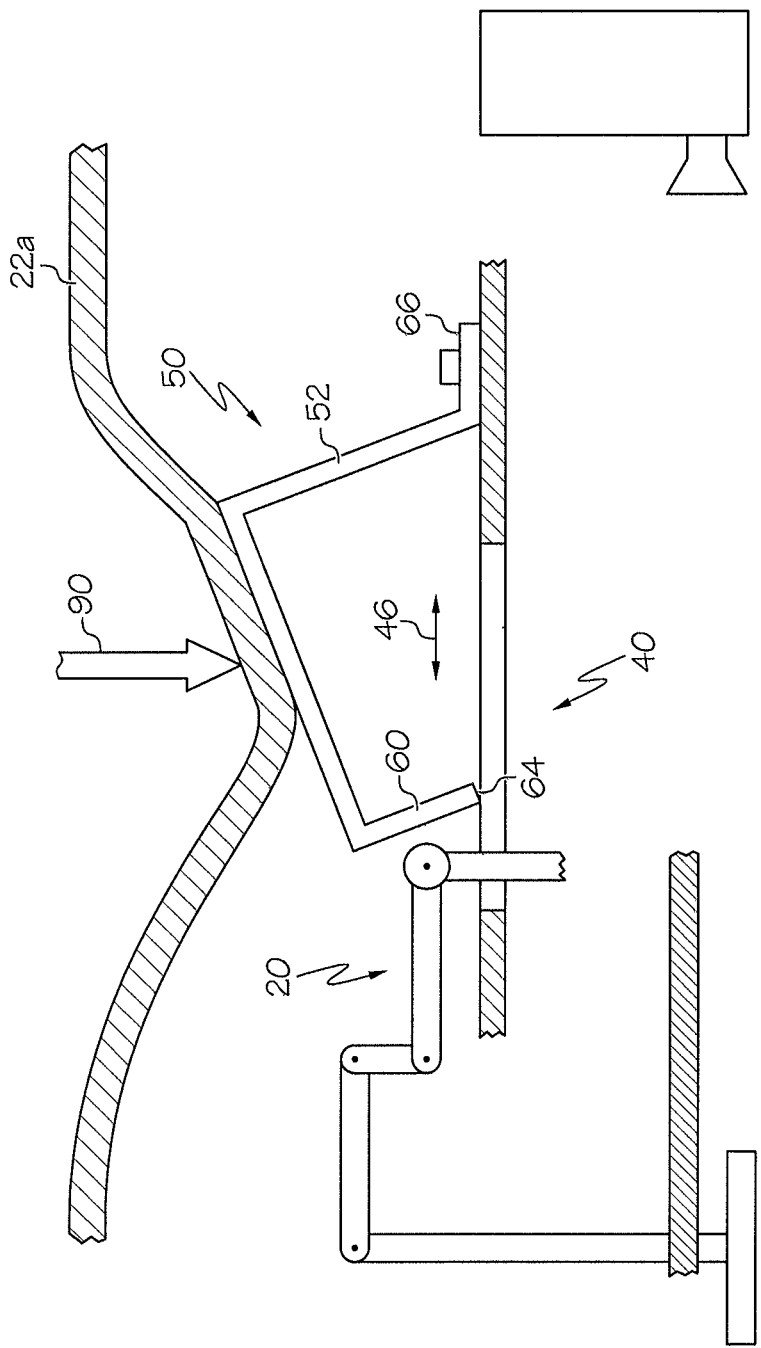
FIG. 4 is a diagrammatic view of the door latch assembly in a side impact condition, according to one or more embodiments shown and described herein.

Referring to FIG. 4, the inner panel 22a is illustrated moving inwardly in the vehicle lateral direction. As the inner panel 22a moves, the inner panel 22a can engage the latch release blocking structure 50. The inner panel 22a may continue to move, which can cause the first leg 52 to bend away from the attachment between the foot 66 and the door handle mounting bracket 40 due to the cantilevered support arrangement. The first leg 52 bends which causes the second leg 60 and the free end 64 to move in the vehicle lateral direction toward the door handle mounting bracket 40 thereby decreasing the size of the gap 70. Movement of the first leg 52 can cause the free end 64 to engage the door handle mounting bracket 40 thereby closing the gap 70 and also blocking off the travel path 46 of the latch release lever 20 to move into the actuated configuration as shown by FIG. 3. The second leg 60, in this blocking orientation, inhibits movement of the latch release lever 20 by reducing the size of the gap 70 an amount that blocks passage of the latch release lever 20 thereby.

The latch release blocking structure 50 can be formed of any suitable material, such as metal, that allow for deformation of the latch release blocking structure 50 as described above. Further, other shapes for the latch release blocking structure 50 may be used other than the squared shape illustrated above, such as a rounded shape, irregular shape, etc.

Figure 5:
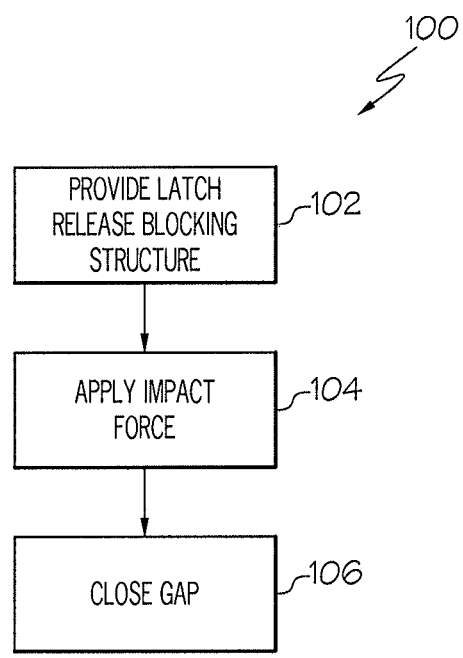
FIG. 5 illustrates a method of inhibiting movement of the door latch of FIG. 2 from a latched configuration to an unlatched configuration, according to one or more embodiments shown and described herein.

Referring to FIG. 5, a method 100 of inhibiting movement of the door latch assembly 14 from a latched configuration that latches the vehicle door assembly 12 in a closed configuration to an unlatched configuration that allows for opening of the vehicle door assembly 12 is illustrated. At step 102, the latch release blocking structure 50 is provided and is connected to the door handle mounting bracket 40 such that the first leg 52 extends toward the inner panel 22a and away from the door handle mounting bracket 40 and the second leg 60 extends away from the inner panel 22a and toward the door handle mounting bracket 40 to the free end 64 that is spaced from the door handle mounting bracket 40 providing the gap 70. At step 104, a side impact force is applied to the vehicle door assembly 12 that causes the vehicle door structures to move inward including the inner panel 22a. As the inner panel 22a moves inward in the vehicle lateral direction, the inner panel 22a engages the latch release blocking structure 50 thereby moving the free end 64 of the second leg 60 toward the door handle mounting bracket 40 to close the gap 70 between the free end 64 and the door handle mounting bracket 40. Closing the gap 70 at step 106 blocks the travel path 46 of the latch release lever 20, thereby inhibiting movement of the door latch assembly 14 from the latched configuration to the unlatched configuration during the side impact.

The above-described vehicle door assemblies include door latch assemblies that provide latch release blocking structures that can be used to inhibit unintended unlatching of the vehicle door assemblies during a side impact. The latch release blocking structures are mounted at one leg to a mounting bracket and extend to a free end at an opposite second leg that is spaced from the mounting bracket to provide a gap. The door latch assemblies include a latch release lever that can pass through the gap along a travel path during normal operating conditions to place the door latch assemblies in latched and unlatched configurations.

During a side impact, the latch release blocking structures are located to deform with movement of vehicle door structures and close the gap thereby blocking the travel path of the latch release lever.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle door assembly comprising:
      a door handle assembly; and
      a door latch assembly that includes a door latch device operatively connected to the door handle assembly using a latch release lever that moves along a travel path; and
   a latch release blocking structure located within an interior volume of the vehicle door assembly, the latch release blocking structure comprising:
      a first leg that is mounted to a support portion;
      an overhang portion that is connected to the first leg, the overhang portion extending over at least a portion of the travel path of the latch release lever; and
      a second leg that extends from the overhang portion toward a slot in the support portion to a free end that is spaced from the slot providing a gap along the travel path of the latch release lever adjacent the slot, the second leg having a length sized to disallow entry of the latch release lever through the gap in response to a side impact that moves the second leg into the gap.

2. The vehicle of claim 1, wherein the vehicle door assembly comprises an inner panel and an outer panel, wherein the first leg extends outwardly from the support portion in a vehicle lateral direction toward the outer panel.

3. The vehicle of claim 2, wherein the second leg extends from the overhang portion in the vehicle lateral direction away from the outer panel.

4. The vehicle of claim 3, wherein the overhang portion extends in a vehicle longitudinal direction between the support portion and the outer panel.

5. The vehicle of claim 4, wherein the overhang portion is located adjacent the outer panel such that the outer panel engages the overhang portion during a side impact that moves the outer panel in the vehicle lateral direction thereby moving the overhang portion and the free end of the second leg toward the support portion and reducing a dimension of the gap.

6. The vehicle of claim 1, wherein the first leg is connected to the overhang portion by a bend and the second leg is connected to the overhang portion by a bend.

7. A vehicle door assembly comprising:
   a door handle assembly; and
   a door latch assembly that includes a door latch device operatively connected to the door handle assembly using a latch release lever that moves along a travel path; and
   a latch release blocking structure located within an interior volume of the vehicle door assembly, the latch release blocking structure comprising:
      a first leg that is mounted to a support portion;
      an overhang portion that is connected to the first leg, the overhang portion extending over at least a portion of the travel path of the latch release lever; and
      a second leg that extends from the overhang portion toward a slot in the support portion to a free end that is spaced from the slot providing a gap along the travel path of the latch release lever adjacent the slot, the second leg having a length sized to disallow entry of the latch release lever through the gap in response to a side impact that moves the second leg into the gap.

8. The vehicle door assembly of claim 7, wherein the vehicle door assembly comprises an inner panel and an outer panel, wherein the first leg extends outwardly from the support portion in a vehicle lateral direction toward the outer panel.

9. The vehicle door assembly of claim 8, wherein the second leg extends from the overhang portion in the vehicle lateral direction away from the outer panel.

10. The vehicle door assembly of claim 9, wherein the overhang portion extends in a vehicle longitudinal direction between the support portion and the outer panel.

11. The vehicle door assembly of claim 10, wherein the overhang portion is located adjacent the outer panel such that the outer panel engages the overhang portion during a side impact that moves the outer panel in the vehicle lateral direction thereby moving the overhang portion and the free end of the second leg toward the support portion and reducing a dimension of the gap.

12. The vehicle door assembly of claim 7, wherein the first leg is connected to the overhang portion by a bend and the second leg is connected to the overhang portion by a bend.

13. A method of inhibiting movement of a door latch assembly of a vehicle from a latched configuration to an unlatched configuration, the method comprising:
   connecting a first leg of a latch release blocking structure to a support portion located within an interior of a vehicle door assembly, the vehicle door assembly comprising:
      a door handle assembly; and
      a door latch assembly that includes a door latch device operatively connected to the door handle assembly using a latch release lever that moves along a travel path;
   wherein the latch release blocking structure comprises an overhang portion that is connected to the first leg, the overhang portion extending over at least a portion of the travel path of the latch release lever, and a second leg that extends from the overhang portion toward a slot in the support portion to a free end; and
   providing a gap between the slot and the free end along the travel path of the latch release lever adjacent the slot, the second leg having a length preventing entry of the latch release lever through the gap in response to a side impact that moves the second leg into the gap.

14. The method of claim 13 further comprising moving the free end of the latch release blocking structure into the gap to block the latch release lever from moving along the travel path.

15. The method of claim 13, wherein the vehicle door assembly comprises an inner panel and an outer panel, wherein the first leg extends outwardly from the support portion in a vehicle lateral direction toward the outer panel.

16. The method of claim 15, wherein the second leg extends from the overhang portion in the vehicle lateral direction away from the outer panel.

17. The method of claim 16, wherein the overhang portion extends in a vehicle longitudinal direction between the support portion and the outer panel.

18. The method of claim 17, wherein the overhang portion is located adjacent the outer panel such that the outer panel engages the overhang portion during a side impact that moves the outer panel in the vehicle lateral direction thereby moving the overhang portion and the free end of the second leg toward the support portion and reducing a dimension of the gap.

19. The method of claim 13, wherein the first leg is connected to the overhang portion by a bend and the second leg is connected to the overhang portion by a bend.

20. The method of claim 13 further comprising moving the latch release lever through the gap and along the travel path thereby placing the door latch device in the unlatched configuration.

* * * * *